United States Patent [19]
Ohuchi et al.

[11] Patent Number: 5,274,677
[45] Date of Patent: Dec. 28, 1993

[54] CLOCK DISTRIBUTION SYSTEM

[75] Inventors: Noriaki Ohuchi; Akio Morimoto, both of Yokohama; Hiroshi Nakaide, Kawasaki; Fumihiko Saito, Yokohama; Hiroyuki Kaneko, Kawasaki, all of Japan

[73] Assignee: Fujitsu Limited, Kanagawa, Japan

[21] Appl. No.: 752,124

[22] Filed: Aug. 29, 1991

[30] Foreign Application Priority Data

Aug. 31, 1990 [JP] Japan .................. 2-231494

[51] Int. Cl.[5] .............................................. H04L 7/00
[52] U.S. Cl. ................................... 375/107; 328/63; 375/36
[58] Field of Search ................ 375/107, 36; 361/397, 361/413; 328/63, 105, 72; 307/269

[56] References Cited

U.S. PATENT DOCUMENTS 4,839,604 6/1989 Tanahashi ...................... 375/107 X

FOREIGN PATENT DOCUMENTS 373773 6/1990 European Pat. Off. .
56-19700 2/1981 Japan .

OTHER PUBLICATIONS

Patent Abstracts of Japan, vol. 12, No. 125 (P-691) (2972), Apr. 19, 1988 Japanese Patent Publication 62-249259, Oct. 30, 1987, Yasunobu Iwata, "Computer System".
Patent Abstracts of Japan, vol. 9, No. 299 (P-408), Nov. 27, 1985, Japanese Patent Publication 60-134924, Jul. 18, 1985, Kishino Takumi et al., "Option Unit Connection System".
IBM Technical Disclosure Bulletin, vol. 32, No. 10A, Mar. 1990, Armonk, N.Y., "Termination Circuitry for Multiple Differential Clock Copies" pp. 371-372.

*Primary Examiner*—Curtis Kuntz
*Assistant Examiner*—Tesfaldet Bocure
*Attorney, Agent, or Firm*—Nikaido, Marmelstein, Murray & Oram

[57] ABSTRACT

A clock distribution system includes a clock generation and distribution part for generating a clock signal and distributing the generated clock signal to a plurality of destinations, slots in each of which a clock reception unit can be detachably mounted, and a plurality of transmission lines coupling the clock generation and distribution part to the slots. Each slot includes a circuit for generating a mount state signal which indicates whether or not the slot is mounted with a clock reception unit, and for supplying the mount state signal to the clock generation and distribution part via a transmission line. This mount state signal has a first state when no clock receiving unit is mounted in the slot and has a second state when a clock receiving unit is mounted in the slot. The clock generation and distribution part includes a circuit for receiving the mount state signal from each slot and for transmitting via the transmission line the clock signal to each slot from which a mount state signal having the second state is received.

17 Claims, 2 Drawing Sheets

5,274,677

CLOCK DISTRIBUTION SYSTEM

BACKGROUND OF THE INVENTION

The present invention generally relates to clock distribution systems, and more particularly to a clock distribution system for distributing high-speed signals such as clocks to printed circuit board units within a digital network equipment and the like.

BACKGROUND OF THE INVENTION

In synchronizing networks of the recent digital synchronous multiplex communication systems, a high-speed clock which is synchronized to a basic clock is generated by a clock generator within the digital network equipment and is distributed to various parts of the digital network equipment. However, the conventional distribution system cannot cope with the high-speed signals of the synchronizing networks, and there is a demand to realize a distribution system which can satisfactorily distribute high-speed signals.

In the digital multiplex network equipment and the like, a plurality of printed circuit board units are detachably mounted in slots of a shelf. A basic clock for operating each printed circuit board unit is usually generated by a printed circuit board unit which is called a clock generation and distribution part based on an external reference synchronizing clock having a relatively low frequency. The basic clock is then distributed to the receiving printed circuit board units via clock distribution lines which are formed on a back panel printed circuit board for each destination. Each receiving printed circuit board unit which receives the basic clock is provided with a terminating resistor for terminating the clock transmission line, so as to eliminate signal reflection and signal leak to other circuits.

In a large scale equipment, the architecture is such that the structure, such as the number and kind, of the mounting printed circuit board units may be changed depending on the usage, so as to satisfy the needs of the user. In such a case, the clock generation and distribution part which is used as a common part of the equipment is initially mounted regardless of the structure used. For this reason, the basic clock which is generated by the clock generation and distribution part is supplied to all of the slots via a back panel interconnection board and the like, regardless of whether or not a printed circuit board unit is mounted in each slot.

The conventional equipment supplies the basic clock to all of the slots of the equipment. Hence, in the slot which is mounted with a printed circuit board unit, the clock transmission line of the basic clock is terminated by the terminating resistor of the printed circuit board unit. However, in the slot which is not mounted with a printed circuit board unit, no means exists to terminate the clock transmission line of the basic clock, and there are problems in that the basic clock reflects and also leaks to other circuits as noise.

Particularly when the basic clock has a frequency of several tens of MHz or higher, the above described problems become more notable.

SUMMARY OF THE INVENTION

Accordingly, it is a general object of the present invention to provide a novel and useful clock distribution system in which the problems described above are eliminated.

Another and more specific object of the present invention is to provide a clock distribution system comprising a clock generation and distribution part for generating a clock signal and distributing the generated clock signal to a plurality of destinations, a plurality of slots in each of which a clock reception unit can be detachably mounted, and a plurality of transmission lines coupling the clock generation and distribution part to the slots, where each slot includes first a device for generating a mount state signal which indicates whether or not the slot is mounted with a clock reception unit, and for supplying the mount state signal to the clock generation and distribution part via a transmission line, the mount state signal has a first state when no clock receiving unit is mounted in the slot and has a second state when a clock receiving unit is mounted in the slot. The clock generation and distribution part includes second device for receiving the mount state signal from each slot and for transmitting via the transmission line the clock signal to each slot from which a mount state signal having the second state is received. According to the clock distribution system of the present invention, it is possible to prevent reflection and leakage of the clock signal when distributing the clock signal to the slots regardless of whether or not each slot is mounted with a clock reception unit.

Still another object of the present invention is to provide a clock distribution system for distributing a clock signal which is generated from a clock generation part to a plurality of slots via transmission lines, where each of the slots are capable of being detachably mounted with a clock receiving unit which includes a terminating device for terminating the transmission line when mounted in the slot, and the clock distribution system comprises first means for generating with respect to each slot a mount state signal which indicates whether or not a clock reception unit is mounted in the slot, where the mount state signal has a first state when no clock receiving unit is mounted in the slot and has a second state when a clock receiving unit is mounted in the slot, and second means for receiving the mount state signal from each slot via the transmission lines and for transmitting via the transmission lines the clock signal to only the slots from which the mount state signal having the second state is received.

Other objects and further features of the present invention will be apparent from the following detailed description when read in conjunction with the accompanying drawings.

DESCRIPTION OF THE PREFERRED EMBODIMENTS

Figure 1:
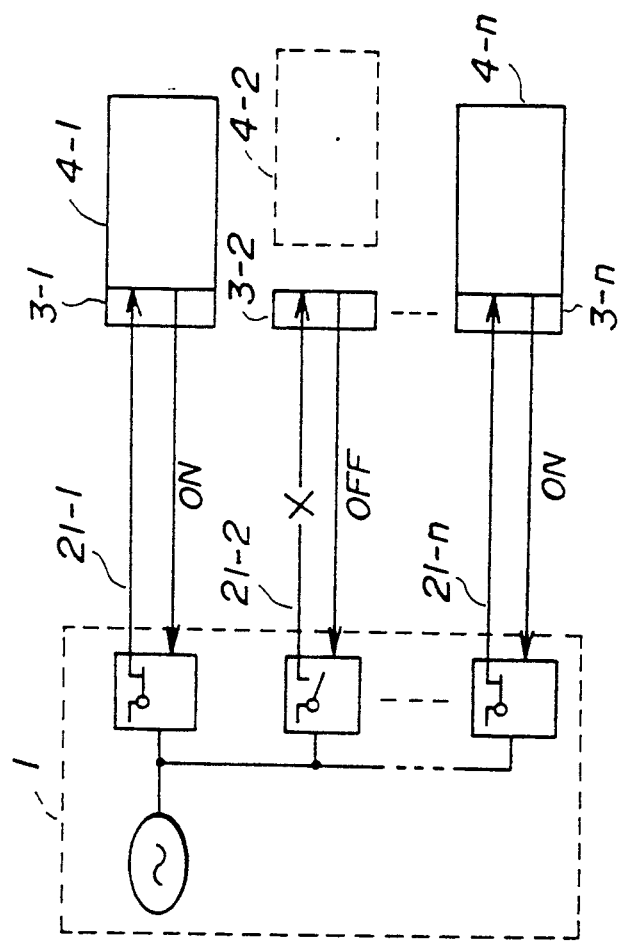
FIG. 1 is a system block diagram for explaining an operating principle of a clock distribution system according to the present invention.

First, a description will be given of an operating principle of a clock distribution system according to the present invention, by referring to FIG. 1. An equipment shown in FIG. 1 includes a clock generation and distribution part 1, a plurality of clock transmission lines 21-1 through 21-n, a plurality of slots 3-1 through 3-n, and a plurality of clock reception units 4-1 through 4-n.

The clock reception units 4-1 through 4-n are respectively mounted in the corresponding slots 3-1 through 3-n. A basic clock generated by the clock generation and distribution part 1 is distributed to each of the clock reception units 4-1 through 4-n via the respective clock transmission lines 21-1 through 21-n.

Each slot 3-i supplies to the clock generation and distribution part 1 a mount state signal which indicates whether or not a corresponding clock reception unit 4-i is mounted in the slot 3-i, where i=1 to n. Based on the mount state signals received from the slots 3-1 through 3-n, the clock generation and distribution part 1 controls the transmission of the basic clock to the clock transmission lines 21-1 through 21-n, so that the basic clock is transmitted to only those clock transmission lines which are coupled to the slots mounted with the clock reception unit.

Therefore, the basic clock is not transmitted to those clock transmission lines which are coupled to the slots which are not mounted with the clock reception unit. For this reason, even though no means is provided to terminate the clock transmission line coupled to the slot which is not mounted with the clock reception unit, no reflection of the basic clock and no leakage of the basic clock to other circuits occur because the clock generation and distribution part 1 supplies no basic clock to such a clock transmission line.

Figure 2:
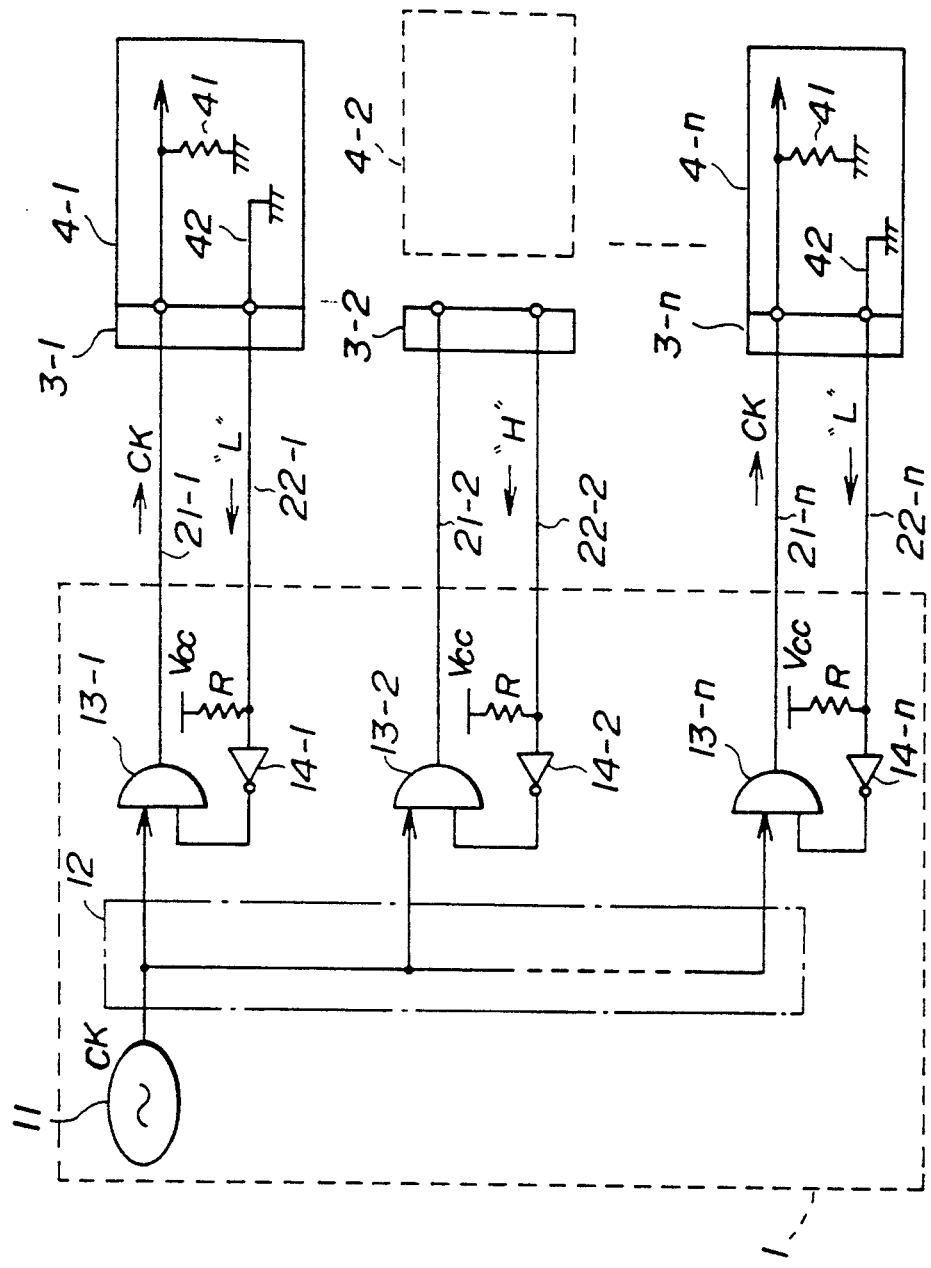
FIG. 2 is a system block diagram showing an embodiment of the clock distribution system according to the present invention.

Next, a description will be given of an embodiment of the clock distribution system according to the present invention, by referring to FIG. 2. In FIG. 2, those parts which are the same as those corresponding parts in FIG. 1 are designated by the same reference numerals, and a description thereof will be omitted.

In FIG. 2, the clock generation and distribution part 1 includes a clock generator 11, a clock distribution circuit 12, 2-input AND gates 13-1 through 13-n, inverters 14-1 through 14-n, and resistors R which are coupled as shown. Each clock transmission line 21-i forms a pair with a corresponding transmission line 22-i, where i =1 to n, and each line pair is coupled to a corresponding slot 3-i via a back panel interconnection board and the like.

For example, the clock generator 11 generates a basic clock CK which is to be used within the equipment based on an external reference clock. In this embodiment, the external reference clock has a frequency of 64 kHz, and the basic clock CK has a frequency of 25 MHz. The basic clock CK is distributed to n predetermined destinations by the clock distribution circuit 12 which includes buffer elements. The basic clock CK which is distributed into the n predetermined destinations is supplied to first input terminals of the corresponding AND gates 13-1 through 13-n. On the other hand, a mount state signal which is received from the transmission line 22-i and pulled up by the resistor R is inverted by the inverter 14-i and supplied to a second input terminal of the AND gate 13-i, where i=1 to n. Each resistor R is coupled between a power source Vcc and an input of the corresponding inverter 14-i. An output of the AND gate 13-i is coupled to the corresponding clock transmission line 21-i, where i=1 to n.

When the clock reception unit 4-i is mounted in the corresponding slot 3-i, the corresponding clock transmission line 21-i and the transmission line 22-i become coupled and the basic clock CK received via the clock transmission line 21-i is supplied to a data processing part (not shown) of the clock reception unit 4-i, where i=1 to n. The clock reception unit 4-i includes a terminating resistor 41 for terminating the clock transmission line 21-i, and a grounding circuit 42 for grounding the transmission line 22-i to 0 V, where i=1 to n.

Next, a description will be given of the operation of this embodiment. When the clock reception unit 4-i is mounted in the corresponding slot 3-1, for example, the transmission line 22-1 is grounded and a mount state signal of 0 V (logic value "0", or low-level) is transmitted to the clock generation and distribution part 1 via the transmission line 22-1. This low-level mount state signal is inverted into a high-level signal by the inverter 14-1, and the AND gate 13-1 is opened by the high-level output signal of the inverter 14-1. As a result, the basic clock CK passes through the AND gate 13-1 and is transmitted to the clock transmission line 21-1. The basic clock CK from the clock transmission line 21-1 is supplied to the clock reception unit 4-1 which is mounted in the slot 3-1 and is terminated by the terminating resistor 41 in a normal manner. Hence, the data processing part of the clock reception unit 4-1 can carry out a predetermined data processing.

On the other hand, when the clock reception unit 4-2 is not mounted in the corresponding slot 3-2, for example, the transmission line 22-2 becomes open-circuited. As a result, a mount state signal on the transmission line 22-2 is pulled up by the resistor R and a high-level mount state signal is supplied to the clock generation and distribution part 1. The high-level mount state signal is inverted into a low-level signal by the inverter 14-2 and is supplied to the AND gate 13-2. In this case, the AND gate 13-2 is closed by the low-level output signal of the inverter 14-2, and the AND gate 13-2 blocks the basic clock CK from being transmitted to the clock transmission line 21-2.

Therefore, the basic clock CK is transmitted to the clock transmission line only when the slot coupled to this clock transmission line is mounted with a clock reception unit. In other words, the basic clock CK is not transmitted to the transmission line which is coupled to the slot which is not mounted with a clock reception unit. For this reason, it is possible to positively prevent reflection of the basic clock CK and leakage of the basic clock CK to other circuits, because the basic clock is only supplied to the clock transmission line which is coupled to the slot which is mounted with a clock reception unit, which clock reception unit is provided with the terminating means.

Further, the present invention is not limited to these embodiments, but various variations and modifications may be made without departing from the scope of the present invention.

What is claimed is:

1. A clock distribution system comprising:
a clock generation and distribution part generating a clock signal and distributing the generated clock signal to a plurality of clock reception units;
a plurality of slots in each of which one of said clock reception units can be detachably mounted; and
a plurality of transmission lines coupling said clock generation and distribution part to said slots,
each slot including first means for generating a mount state signal, said mount state signal indicates whether one of the clock reception units is mounted in said slot, and each slot supplying said mount state signal to said clock generation and distribution part via one of said transmission lines, said mount state signal having a first state when no clock reception unit is mounted in said slot and having a second state when one of said clock reception units is mounted in said slot, said clock generation and distribution part including second means for receiving said mount state signal from each slot and for transmitting via said transmission lines said clock signal to each slot from which said mount state signal having said second state is received.

2. The clock distribution system as claimed in claim 1, wherein said second means blocks said clock signal to each transmission line which is coupled to said slot having no clock reception unit mounted therein.

3. The clock distribution system as claimed in claim 1, wherein each clock reception unit includes terminating means for coupling with said transmission lines when mounted in said slot.

4. The clock distribution system as claimed in claim 1, wherein said clock generation and distribution part includes a clock generator for generating said clock signal, and a clock distribution circuit coupled to said clock generator for distributing said clock signal generated by said clock generator into said plurality of clock reception units.

5. The clock distribution system as claimed in claim 4, wherein said second means includes for each clock reception unit, a gate which receives said clock signal and a control circuit for opening said gate to pass said clock signal only when said mount state signal having said second state is received from said slot via said transmission lines.

6. The clock distribution system as claimed in claim 5, wherein a pair of said transmission lines is provided for each clock reception unit, one of said transmission lines of the pair being coupled to said gate for transmitting said clock signal to said slot, the other of the transmission lines of said pair being coupled to said control circuit for receiving said mount state signal from said slot.

7. The clock distribution system as claimed in claim 6, wherein said clock reception unit includes means for grounding said other of said transmission lines of said pair when mounted in said slot.

8. The clock distribution system as claimed in claim 1, wherein said clock reception units are printed circuit board units.

9. The clock distribution system as claimed in claim 1, wherein said clock signal has a frequency on an order of MHz or greater.

10. A clock distribution system for distributing a clock signal which is generated from a clock generation part to a plurality of slots via transmission lines, each of said slots being capable of being detachably mounted with a clock receiving unit which includes terminating means for terminating the transmission lines when mounted in the slot, said clock distribution system comprising:

first means for generating with respect to each slot a mount state signal, said mount state signal indicates whether said clock receiving unit is mounted in said slot, said mount state signal having a first state when no clock receiving unit is mounted in said slot and having a second state when said clock receiving unit is mounted in said slot; and second means for receiving said mount state signal from each slot via said transmission lines and for transmitting via said transmission lines said clock signal to only said slots from which said mount state signal having said second state is received.

11. The clock distribution system as claimed in claim 10, wherein said first means is provided with respect to each slot.

12. The clock distribution system as claimed in claim 10, wherein said second means is provided in said clock generation part.

13. The clock distribution system as claimed in claim 12, wherein said second means is coupled to each slot via a pair of said transmission lines, one transmission line of said pair being used for transmitting said clock signal from said clock generation part to said slot, the other transmission line of said pair used for transmitting said mount state signal from said slot to said second means.

14. The clock distribution system as claimed in claim 13, wherein said clock reception unit includes means for grounding said other of said transmission lines of said pair when mounted in said slot.

15. The clock distribution system as claimed in claim 10, wherein said second means includes for each clock receiving unit a gate which receives said clock signal and a control circuit for opening said gate to pass said clock signal only when said mount state signal having said second state is received from said slot via said transmission lines.

16. The clock distribution system as claimed in claim 10, wherein said clock reception units are printed circuit board units.

17. The clock distribution system as claimed in claim 10, wherein said clock signal has a frequency on an order of MHz or greater.

* * * * *